(12) United States Patent
Currie (10) Patent No.: US 6,460,574 B2
(45) Date of Patent: Oct. 8, 2002

(54) SEWER PIPE STRUCTURES AND THEIR METHOD OF CONSTRUCTION

(75) Inventor: Russell Darling Currie, Shawbury (GB)

(73) Assignee: Johnston Pipes Limited (GB)

(*) Notice: Subject to any disclaimer, the term of this patent is extended or adjusted under 35 U.S.C. 154(b) by 0 days.

(21) Appl. No.: 09/770,585

(22) Filed: Jan. 26, 2001

(65) Prior Publication Data

US 2001/0042568 A1 Nov. 22, 2001

(30) Foreign Application Priority Data

May 16, 2000 (GB) .............................. 0011820
May 19, 2000 (GB) .............................. 0012547

(51) Int. Cl.[7] .............................. E03F 3/04; F16L 9/18
(52) U.S. Cl. .................. 138/116; 138/117; 138/109; 138/177; 137/561 A; 210/170
(58) Field of Search ................. 138/117, 114, 138/115, 116, 109; 210/170; 137/561 A (56) References Cited

U.S. PATENT DOCUMENTS

| 1,930,285 A | * | 10/1933 | Robinson | 114/79 W |
|---|---|---|---|---|
| 3,872,894 A | * | 3/1975 | Streit | 138/117 |
| 4,096,887 A | * | 6/1978 | Streit | 138/115 |
| 4,281,860 A | * | 8/1981 | Streit | 138/117 |
| 4,578,188 A | * | 3/1986 | Cousino | 210/170 |
| 4,800,907 A | | 1/1989 | Giehl et al. | |
| 6,167,916 B1 | * | 1/2001 | Gustafson et al. | 138/117 |

FOREIGN PATENT DOCUMENTS

| DE | 3941-513 A | * | 6/1991 |
|---|---|---|---|
| DE | 19619618 | | 11/1996 |
| EP | 0582542 | | 9/1994 |
| FR | 2330815 | | 7/1977 |
| GB | 2330 367 A | | 4/1999 |
| JP | 9144122 | | 6/1997 |
| JP | 10-77677 | * | 3/1998 |
| JP | 10-110464 | * | 4/1998 |
| JP | 10-110465 | * | 4/1998 |
| JP | 10110868 | | 4/1998 |
| JP | 2000-129765 | * | 5/2000 |
| JP | 2001-220806 | * | 8/2001 |

* cited by examiner

*Primary Examiner*—Patrick Brinson
(74) *Attorney, Agent, or Firm*—Luedeka, Neely & Graham, P.C.

(57) ABSTRACT

A sewer pipe structure and associate method of construction includes a storage tank connectable to an inflow pipe to receive an inflow of sewage and connectable to an outflow pipe through which the sewage can exit the storage tank. The sewer pipe structure is formed from modular prefabricated sections, including a prefabricated storage pipe section having a cross-sectional area greater than the cross-sectional areas of the inflow and outflow pipes and forming at least part of the storage tank, a prefabricated inflow end cap section fastenable to a first end of the sewer pipe structure to thereby close the first end of the pipe structure, and a prefabricated outflow end cap section fastenable to a second end of the sewer pipe structure to thereby close the second end of the pipe structure. The inflow and outflow end caps include respective connecting means for allowing sewage flow through the pipe section.

45 Claims, 3 Drawing Sheets

SEWER PIPE STRUCTURES AND THEIR METHOD OF CONSTRUCTION

FIELD OF THE INVENTION

This invention relates to sewer pipe structures. More particularly but not exclusively, the invention relates to combined sewer overflow structures. The invention also relates to their method of construction.

BACKGROUND OF THE INVENTION

It is known to construct a combined sewer overflow structure in which sewage or rain water mixed with sewage can flow through an inlet pipe into a storage tank constructed of concrete. At the opposite end of the storage tank is a main outflow pipe continuously feeding either the sewage or mixture of water and sewage to a sewage treatment plant.

During dry weather, a continuous flow of sewage is possible through the storage tank to the sewage treatment plant, using the main outflow pipe only. In a rain storm condition, there will be a rush of water into the storage tank, and the main outflow pipe may not be able to cope with the mixture of water and sewage. The water level in the storage tank will rise, and different items of sewage will be separated out, solids tending to sink, and floatables rising with the water level. Previously, if required, excess water would be allowed to escape from the storage tank through an upper discharge outlet, e.g. into a river, but a proportion of the sewage would also tend to flow out, thus polluting the environment in a manner which would now be unacceptable.

A known improved method is to provide a weir/scum board arrangement in the storage tank, which acts as a stilling pond. Relatively clean water flows over the weir and is discharged through a spill outflow, whilst the floatables are retained within the storage tank by the scum board. A mixture of water and sewage continues to be discharged through the main outflow pipe to the sewage treatment plant. It is known to provide side weirs which extend longitudinally of the storage tank or an end weir which is transverse to the direction of flow through the structure.

In the case of side weirs their efficiency is partly dependent on their length, since the longer the weir, the shallower is the water flowing over the weir. Similarly the efficiency of an end weir is partly dependent on its distance from the inlet to the storage tank and the extent to which the speed of flow has declined, whereby a greater depth of overflow can be tolerated.

As the water level falls the floatables drop to the bottom of the storage tank and flow through the main outflow pipe to the sewage treatment plant.

Construction of the concrete storage tank with its weir/scum board arrangement is a complicated task involving a considerable amount of time and labour on site.

Therefore, there is a need to facilitate the construction of a modular, prefabricated storage tank, together with an inlet pipe and at least one outlet pipe, and any internal weir/scum board arrangement.

SUMMARY OF THE INVENTION

According to the invention there is provided a sewer pipe structure comprising a storage tank having at one end an inflow pipe of predetermined diameter and at the opposite end at least one outflow pipe whereby sewage alone or a mixture of water and sewage is permitted to flow through the structure, wherein the structure is a modular prefabricated pipe structure in which the storage tank is at least one pipe length, and at each end of the storage pipe there is provided an end cap formed of a pipe of the same nominal diameter as the storage pipe, with one closed end wall and the inflow pipe, in the case of the upstream end cap, and at least one outflow pipe, in the case of the downstream end cap, extending through the closed end wall of the respective end cap.

The storage pipe may be formed of a plurality of pipe lengths jointed together in series.

Preferably the storage pipe has a dry weather flow channel extending therethrough in an axial direction along its base, the channel interconnecting the inflow pipe in the upstream end cap and at least one outflow pipe in the downstream end cap.

The dry weather flow channel is preferably formed by two pipe sections extending longitudinally along the base of the storage pipe in spaced relation to one another. The pipe sections preferably define a generally V-shaped channel in cross-section narrowing towards the bottom of the channel, the convex surfaces of the two pipe sections facing each other.

Preferably the storage pipe, or at least one of the pipe lengths forming the storage pipe, includes an overflow weir allowing water flowing over the weir to flow to at least one spill outflow, preferably a pipe in the outer wall of the storage pipe, through which the overflow water is discharged from the pipe structure.

The overflow weir may be at least one side weir extending longitudinally of the storage pipe, and wherein means are provided for conveying the water which flows over the weir to the or each spill outflow. Preferably the or each side weir is formed by the lip of a channel formed by a pipe section attached to or suspended from the internal wall surface or the top of the storage pipe, for conveying the water which flows over the weir to pipework communicating with the or each spill outflow.

Preferably the or each side weir channel is more than a semicircle to give it high sides and is open at its top, along its length.

Alternatively, an end overflow weir is provided close to the downstream end of the storage pipe, the weir extending transversely to the length of the storage pipe for allowing an overflow of water to flow to a spill outflow through which the overflow water is discharged from the pipe structure.

Preferably the or each weir is provided with an associated scum board extending substantially parallel to the weir and downwardly to a level below the level of the weir, and which is positioned sufficiently close to the weir to resist floatables passing over the weir.

Preferably each pipe length and pipe section is formed of GRP.

The closed end wall of each end cap is preferably formed by an infill of concrete or a precast concrete panel.

The invention also provides a method of constructing a modular, prefabricated sewer pipe structure comprising forming one or more pipe lengths to be connected together in series to form a storage tank, forming an upstream end cap with one closed end wall and an inflow pipe of predetermined diameter, forming a downstream end cap with one closed end wall and at least one outflow pipe, and assembling the pipe lengths and end caps to form the pipe structure in which sewage alone or a mixture of water and sewage can flow through the structure.

BRIEF DESCRIPTION OF THE DRAWINGS

By way of example, specific embodiments in accordance with the invention will be described with reference to the accompanying drawings in which.

DETAILED DESCRIPTION OF THE PREFERRED EMBODIMENT(S)

Figure 1:
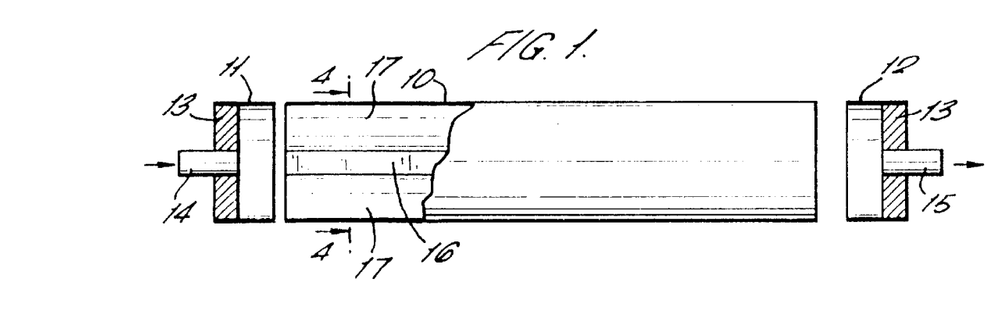
FIG. 1 is a plan view of a modular prefabricated pipe structure having a storage tank and end caps, the storage tank being partly cut-away to show the base channel.
Figure 2:
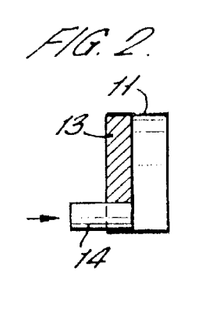
FIG. 2 is a side view of the end cap at the upstream end of the storage tank of FIG. 1.
Figure 3:
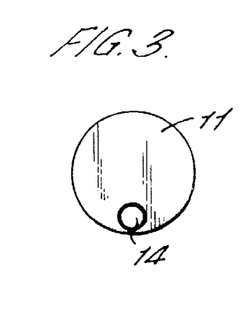
FIG. 3 is an internal end view of the end cap at the upstream end.

Referring to FIGS. 1 to 3 of the drawings, there is shown a first embodiment of a modular prefabricated pipe structure comprising a storage tank and two end caps 11, 12. In accordance with the invention each element is formed of a pipe or pipes. The central storage tank 10 is constructed of a circular pipe of a large diameter and required length jointed to end caps 11, 12 at its upstream and downstream ends by conventional push-in or ring sealed joints. The upstream end cap 11 is a circular pipe of the same diameter as the storage pipe 10 with an infill of concrete 13 to form a closed end wall, and has a small diameter inflow pipe 14 cast in the end wall at the invert position. The downstream end cap 12 is of similar construction as the upstream end cap 11 with an infill of concrete 13 to form a closed end wall, and has a small diameter outflow pipe 15 cast in at the invert position. The outflow pipe 15 may be provided with control means for controlling the flow rate through the outflow pipe. For example, the control means may be a control plate which can vary the outflow aperture, e.g. by vertical adjustment, through an access point in the end cap, or can be removed from the outflow pipe in the event of it being necessary to remove a blockage. The outflow pipe 15 may be provided with means for fixing a conventional vortex plate, if required.

Both the inflow pipe 14 and the outflow pipe 15 are aligned with a dry weather flow channel 16 extending longitudinally along the base of the storage pipe 10. Sewage alone or a mixture of water and sewage thereby flows through the pipe structure, passing through the inflow pipe 14, along the channel 16 and is discharged through the outflow pipe 15 to a sewage treatment plant (not shown).

The diameter of the inflow pipe 14 may be, for example, 300 mm to 1000 mm depending on the expected maximum flow rate, and the other dimensions are then selected relative to the diameter of the inflow pipe, generally according to conventional sewer technology. By way of example, the storage pipe diameter may be selected between 1000 mm and 2500 mm. The downstream end cap may also be flow calibrated prior to installation. This may be achieved by filling up the structure with water and measuring the flow rate through the outflow pipe 15 to ensure that it complies with required flow conditions. Flow calibration can be carried out as part of the production of the pipe structure or with the pipe structure assembled but not yet installed. Similar flow calibration of the inlet pipe 14 may also be carried out prior to installation.

During dry weather, sewage alone will flow through the pipe structure, partly filling only the channel 16. In a rain storm condition, the flow comprises a mixture of rain water and sewage, and as the flow rate increases, the storage pipe 10 will fill to a higher level with a proportion of the mixture being continuously discharged through the outflow pipe 15 to the sewage treatment plant. The level drops as the flow rate declines.

The pipes forming the storage tank 10 and end caps 11, 12 may be formed of any convenient material, for example GRP (glass fibre reinforced plastics), polyvinyl chloride, steel or pre-cast concrete. However, GRP is the preferred material and the pipes of this embodiment and the following embodiments are made of GRP. GRP pipe is lightweight, smooth, corrosion resistant, and compared with concrete has a much thinner wall thickness allowing a greater capacity in a given size of excavation in the ground. Another advantage of GRP or similar material over concrete is that it can be readily cut to form pipe sections for use as other items of the pipe structure rather than, in the case of concrete, these items being formed separately, either as pre-cast units or manually on site requiring shuttering. A further advantage compared to concrete is that GRP is a pressure resistant pipe material and can provide a pressure resistant joint.

Figure 4:
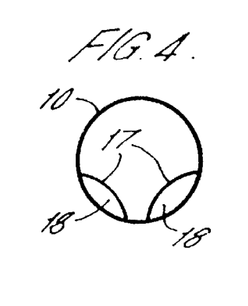
FIG. 4 is a section along line 4—4 in FIG. 1.

In particular, FIG. 4 shows that the dry weather channel 16 of the storage pipe 10 is formed, in this embodiment, by two arcuate pipe sections 17 attached longitudinally to the internal wall of the storage pipe in spaced relation with their convex surfaces facing each other. The space between the pipe sections 17 forms the dry weather flow channel 16, and the sides act in a similar manner to conventional benching to direct the sewage towards the centre. However, conventional benching is on either side of the dry weather flow channel and does not form part of the channel itself. One advantage of the channel, in this embodiment, is that the pipe sections 17 form the dry weather flow channel 16 which is substantially V-shaped in cross-section progressively decreasing in width in a downward direction whereby the flow rate is faster at the bottom, which assists the flow of sewage along the channel towards the outflow pipe 15 in the downstream end cap 12. The curvature of the pipe sections 17 may be varied to suit different circumstances. Moreover, at one or both sides, the upper area of the benching formed by the respective pipe section 17 may be generally level so that it provides a walkway through the pipe structure.

Another advantage of employing pipe sections 17 for the formation of the dry weather flow channel 16 is that it is the smooth external surface of each pipe section 17 which is in contact with the water and sewage thereby reducing the resistance to flow of sewage along the channel. The smooth surface further assists to discharge the sewage element rather than allowing solids to settle, so that the channel and benching is substantially self-cleaning. The under space 18 between each pipe section 17 and the outer pipe wall of the storage pipe 10 is closed at each end and can be provided with appropriate hatches 19 (see FIG. 8) to allow the space to be infilled with gravel after or during installation of the pipe structure, if desired, to resist any tendency for the pipe to be displaced upwardly in the ground during use, e.g. because of a high water table.

Access manholes (not shown) are provided in any module of the pipe structure to allow personnel to enter the pipe structure for cleaning or inspection purposes. Generally, at least two manholes would be provided one at either end to allow the inflow of air and for noxious fumes to be emitted. Manholes would also be provided especially at the downstream end, for example, in the downstream end cap 12 to allow personnel to enter the pipe structure to clear any blockage which may occur.

Figure 5:
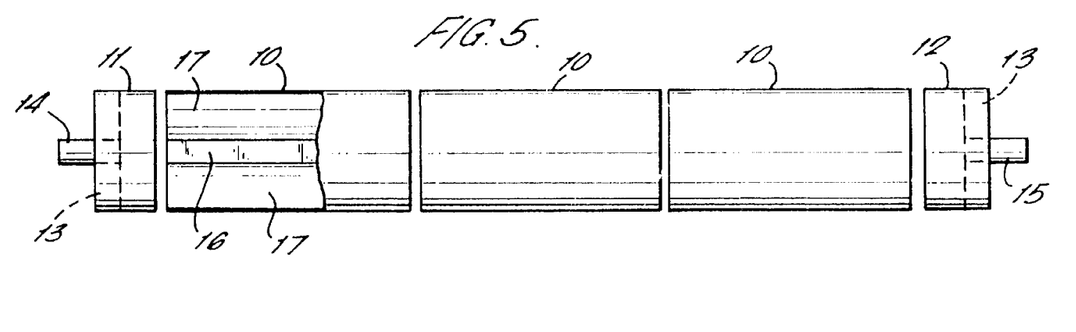
FIG. 5 is a similar plan view to FIG. 1 of a second embodiment in which the storage tank is formed of three pipe lengths.

FIG. 5 shows a second embodiment in which the central storage pipe 10 of the pipe structure is formed of a plurality of, for example, 6 meter pipe lengths, in series, three lengths being shown in this embodiment. The pipe lengths 10 are jointed together and to the respective end caps 11, 12 by conventional push-in or ring sealed joints.

Figures 6, 7, 8, 9, 10, 11:
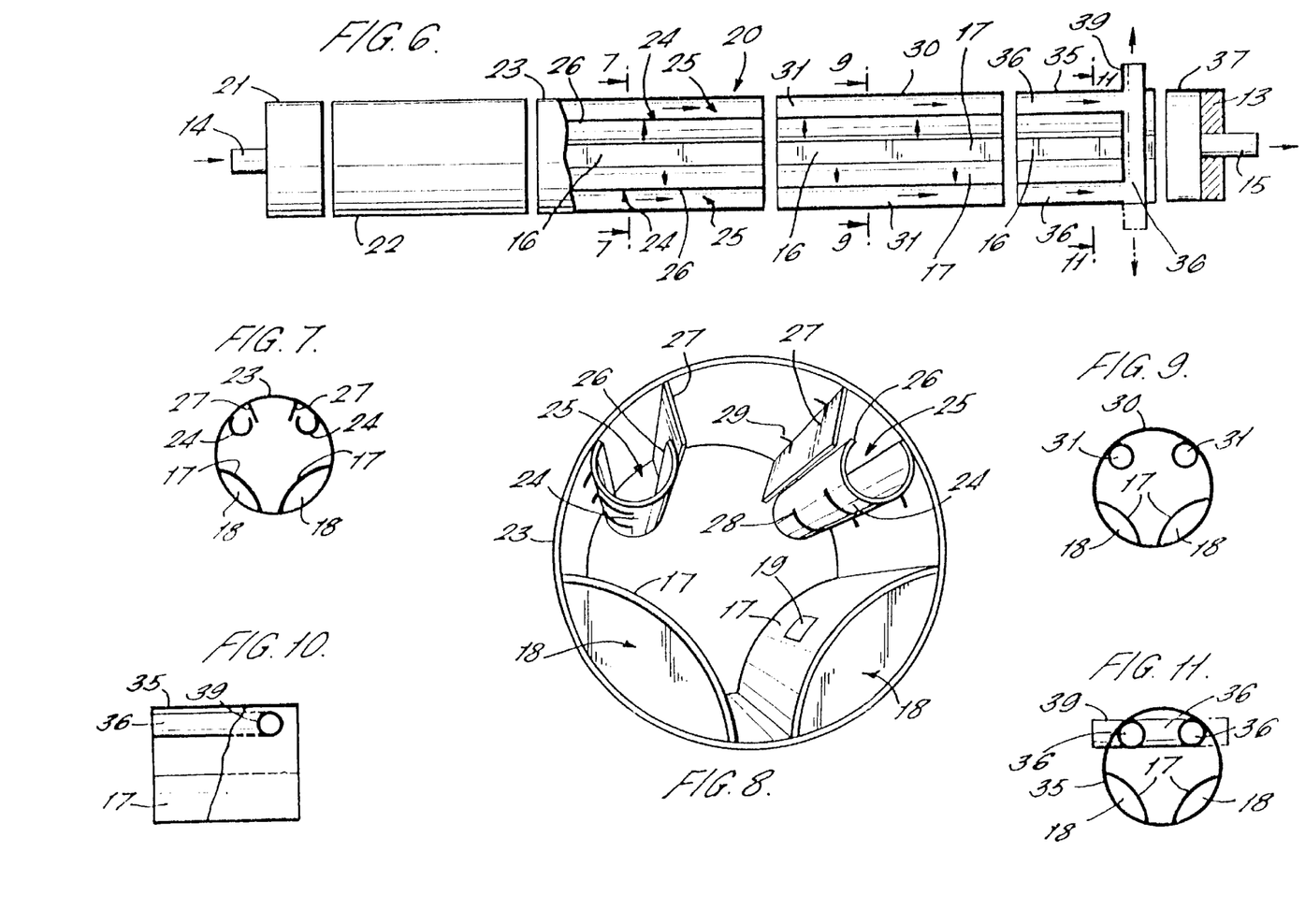
FIG. 6 is a plan view of a third embodiment in which the second pipe length includes side weirs and the third pipe length is a transfer unit leading to a spill outflow in a fourth pipe length jointed to the downstream end cap.
FIG. 7 is a section along line 7—7 in FIG. 6.
FIG. 8 is a perspective view of the internal construction of the second pipe length of the embodiment of FIG. 6.
FIG. 9 is a section along line 9—9 in FIG. 6.
FIG. 10 is a side view through the fourth pipe length in the embodiment of FIG. 6, partially cut-away.
FIG. 11 is a section along line 11—11 of FIG. 6.

FIGS. 6 and 7 show a third embodiment in which there is provided a combined sewer overflow structure 20. The end caps 21, 37 at the upstream and downstream ends respectively, are constructed in the same manner as the end caps 11, 12 in the previous embodiment. The same applies to the first pipe length 22 which is constructed in the same manner as the single pipe length 10 of FIGS. 1 to 4 or as each of the pipe lengths 10 in FIG. 5. Similarly, in this embodiment, the first pipe length 22 may be formed of a series of pipe lengths.

The second pipe length 23 shown in FIG. 6 additionally has side weirs 24 extending along the length of the pipe, together with associated scum boards 27. Each weir 24 comprises a channel 25 formed by an arcuate pipe section which is open at its top along its length. The inner lip 26 of the channel 25 defines the level of the weir and the open channel provides a flow path for the discharge of water which passes over the weir to the adjacent downstream third pipe length 30. Each weir channel 25 may be a semicircle in cross-section or may be more or less than a semicircle. Alternatively, the weir channel may be formed in other shapes, for example, as described below in relation to FIG. 15. The outer wall of each weir channel 25 is attached to the internal wall surface of the outer pipe (see FIGS. 7 and 8) whereby the respective weir channel is hung on the wall of the outer pipe length at a level in the upper portion of the outer pipe length or adjacent its top. For additional support if desired, or for safety reasons, there may be provided stainless steel brackets 28 (see FIG. 8) supporting each weir channel 25, attached to the internal wall surface of the outer pipe 23, for example, by bolts. However, it will be appreciated that, in use, under overflow conditions, whilst the weir channel 24 is carrying water, it is also being supported from underneath, because the pipe length 23 will be full of water and sewage up to the level of the inner lip of the weir channel 25, for overflow to occur.

Alternatively, the pipe section channels 25 forming the side weirs 24 may be suspended from the top of the outer pipe length 23 using stainless steel brackets.

In either case, the weir channels 25 may be formed with a taper extending outwardly in the downstream direction or a gradient which could be downwardly or upwardly depending on the angle of the outer pipe 23. Alternatively, each weir channel 25 may be suspended so that it is given a desired gradient. In each case, each weir channel can be a cut pipe section.

For each weir channel 25, there is an associated scum board 27, which can also be supported by stainless steel brackets 29, if desired. The scum board 27 extends substantially parallel to the weir channel and downwardly to a level below the level of the lip 26 of the weir channel, the spacing of the scum board from the weir channel being selected to be most effective to trap floatables and/or ensure or improve oil retention. For this purpose, each scum board 27 may be a flat panel as illustrated, or may be a further pipe section arranged in the position and direction of curvature which gives most benefit to preclude floatables from flowing over the weir. An advantage of using a pipe section for the scum board is that a special panel is not required to be manufactured.

The length of the side weir 24 will determine the depth of any water overflowing into the weir channel and therefore the particle size of sewage or other foreign material flowing with the water. For this reason, although only one second pipe length 23 is illustrated, there may be provided a plurality of second pipe lengths 23 to provide a longer weir length and thereby a shallower depth of water overflowing the weir.

The third pipe length 30 shown in FIG. 6 is a transfer unit for transferring water which overflows into the weir channels 25 to a fourth pipe length 35 having at least one spill outflow through which the overflow water is discharged from the pipe structure. This third pipe length is constructed in the same manner as the or each second pipe length 23 except that complete, circular pipes 31 are aligned with the open-top weir channels 25 of the second pipe length 23 or the most downstream second pipe length if more than one second pipe length is employed in the pipe structure. The pipes 31 of the third pipe length are attached to the internal wall surface of the outer pipe and are supported in the same manner as the weir channels 25 of the or each second pipe length. To give greater capacity to the storage tank, the third pipe length may be formed of a series of pipe lengths.

The fourth pipe length 35 is jointed to the downstream end of the third pipe length 30, or the final third pipe length, in the same manner as the other pipe lengths are jointed together. The fourth pipe length has a dry weather flow channel 16 constructed in the same manner as in each preceding pipe length, communicating with the main outflow pipe 15 in the downstream end cap 37. Continuation pipes 36 are provided in the fourth pipe length 35 for receiving the overflow water from the third pipe length 30, or the most downstream third pipe length, and for communicating the overflow water to at least one spill outflow 39 which extends transverse to the general direction of flow through the pipe structure. The or each spill outflow 39 may discharge the overflow water at a high and/or low level and at one side or the other side of the pipe structure, as desired.

The spill outflow 39 may include means for screening the outflow of water, e.g. a mesh barrier, either internally of the spill outflow pipe or externally of the pipe structure. Alternatively, screening means may be provided upstream of the spill outflow 39, for example, within the weir channels 25 or within the pipes 31 or the pipes 36.

Figure 12:
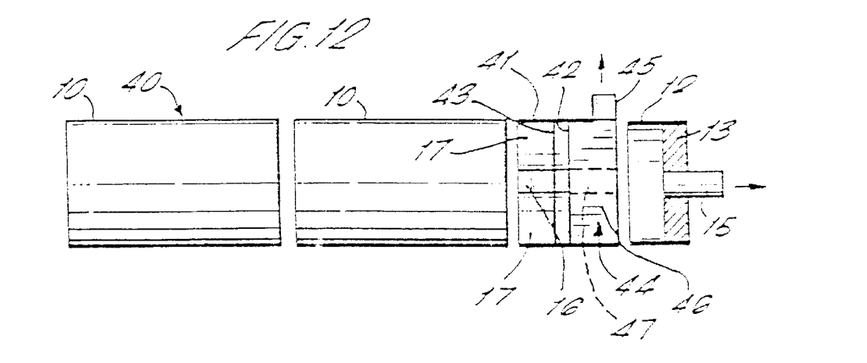
FIG. 12 is a plan view of a fourth embodiment in which a pipe length adjacent the downstream end cap includes an end weir and scum board arrangement.
Figure 13:
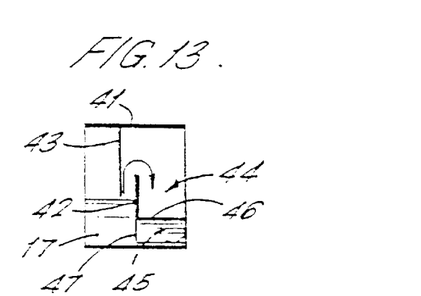
FIG. 13 is a side view of the pipe length including the end weir and scum board arrangement in the embodiment of FIG. 12.
Figure 14:
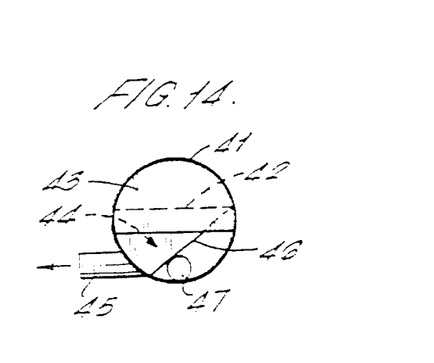
FIG. 14 is an internal end view of the pipe length including the end weir and scum board arrangement in the embodiment of FIG. 12.

FIGS. 12 to 14 illustrate an alternative combined sewer overflow pipe structure 40 in which there is provided an end weir 42 and scum board 43 arrangement instead of the side weirs 24 and associated scum boards 27 of the embodiment of FIGS. 6 to 11. The end caps 11, 12 and storage pipe length or lengths 10 are constructed in the same manner as shown in FIGS. 1 to 5. Forming the downstream end of the storage pipe length or lengths 10, there is a pipe length 41, including a transverse weir wall 42 upstanding from the bottom of the outer pipe adjacent its downstream end and an associated scum board 43 extending downwardly from the top of the outer pipe, upstream of but close to the weir wall. This end weir 42 and scum board 43 arrangement may be formed from flat panels, as shown, or pipe sections attached to the internal wall of the outer pipe, their curvature being selected and arranged to promote the most efficient overflow of water and retention of floatables and oil. Downstream of the weir 42, there is defined an overflow discharge chamber 44 between the weir and the downstream end cap 12. This overflow discharge chamber 44 has benching 46 in its base or pipework for feeding the overflow water to a low level spill outflow 45 on one side or the other of the pipe structure.

The spill outflow 45 or the chamber 44 may include means for screening the overflow water before it leaves the pipe structure, or screening means may be provided externally of the pipe structure.

A short connecting length of outflow pipe 47 passes through the weir wall 42 and beneath the benching 46 or pipework in the discharge chamber 44 for communicating the dry flow channel 16 in the half pipe length 41 and the outflow pipe 15 in the downstream end cap 12. Alternatively, instead of the pipe 47, there may be an aperture or passage in the weir wall 42 allowing flow between the dry weather flow channel 16 and the outflow pipe 15 in the downstream end cap 12. In either case, the pipe 47 or the aperture or passage in the weir wall 42 may be provided with provision for fixing a conventional vortex plate, if required.

Figure 15:
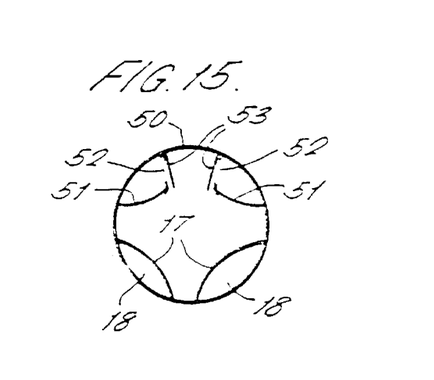
FIG. 15 is a similar view to FIG. 7 showing an alternative embodiment of side weirs, in cross-section.

FIG. 15 illustrates an alternative form of side weir arrangement, in which each weir channel 50 comprises a pipe section of greater capacity than in the embodiment of FIGS. 6 to 11. The channel lip 51 which defines the weir level is substantially vertical, and part of the weir wall is formed by the outer pipe. There is also shown a different form of support bracket 52 which supports both one of the weir channels 50 and its associated scum board 53.

Figure 16:
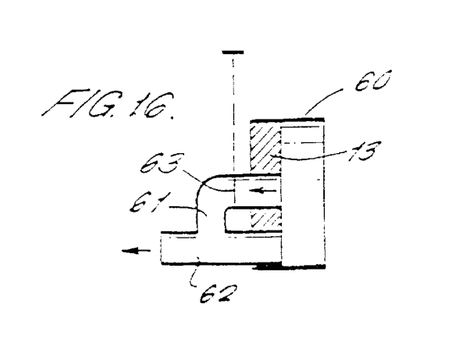
FIG. 16 shows an alternative downstream end cap including a bypass pipe for the flow into the outflow pipe.

FIG. 16 illustrates an alternative downstream end cap 60 which may be employed instead of the end cap 12, 37 of the previous embodiments. The end cap 60 has a bypass pipe 61 in case the main outflow pipe 62 should become blocked. If a blockage occurs, the level of sewage or mixture of water and sewage in the end cap will rise and can exit via the bypass pipe 61. The bypass pipe 61 may be continuously open, or is preferably provided with a valve arrangement 63 which can be opened from above when indicator means signals a blockage causing the rate of outflow in pipe 62 to be reduced.

In a further embodiment, there is provided a baffle element of the pipe structure comprising a short pipe of the same nominal diameter as the other pipe lengths with a transverse wall having a pipe or aperture at least at the invert position. This baffle element may be employed between two adjacent pipe lengths as a restriction on the flow of water and sewage through the pipe structure. If, for example, the baffle element is provided between pipe lengths 23 and 30 in FIG. 6, the element would also have further apertures corresponding to the weir channels 25 or the pipes 31.

Similarly, there may be provided a pipe length or lengths 22 downstream of the fourth pipe length 35, in the embodiment of FIG. 6, to provide a further storage area at the downstream end of the pipe structure.

It will be appreciated that although the general overall dimensions of the different pipe lengths will be relative to the diameter of the inflow pipe 14, specific dimensions and curvatures of, for example, the benching 17 forming the dry weather flow channel 16, or the size and height of the side weirs 24 or any of the other changeable features will be chosen to suit the particular circumstances of the installation.

The invention is not limited to the specific features of the embodiments described above. For example, one or more of the pipe lengths may contain one or more bends rather than defining a straight flow as illustrated. To achieve a bend, two pipe lengths are mitred together end to end, at the required angle. The base channels in each length, as well as any weir channel and scum board, are thereby aligned and continuous.

The closed end wall of each end cap may be provided by a precast concrete panel instead of an infill of concrete, or may be formed of GRP.

Furthermore, lighting may be provided within the pipe lengths of the storage pipe to assist inspection of the pipe and during cleaning. Alternatively, fixtures, e.g. hooks, may be provided in the pipe lengths for hanging temporary lighting for inspection or cleaning purposes.

There may also be provided means for flushing the pipe structure.

Closed circuit television (CCTV) may be provided within the storage pipe.

Means for measuring the level of water and sewage within the storage pipe, e.g. a float, or for measuring the flow rate through one or more lengths of the storage pipe, e.g. a flow measuring propeller, may be provided. The measuring means could be actuated from insertion points in the top of the pipe lengths at appropriate positions along the length of the storage pipe.

Although the invention has been described and illustrated in relation to circular pipes and pipe sections, the invention is not limited thereto. Instead, it is possible to use pipes of square cross-section, or a mixture of circular and square cross-section pipes.

What is claimed is:

1. A sewer pipe structure comprising a storage tank connectable at an upstream end to an inflow pipe to receive therefrom an inflow of sewage or sewage/water mixture and connectable at a downstream end to an outflow pipe through which the sewage or sewage/water mixture can flow from the storage tank, wherein:

the sewage or sewage/water mixture accumulated in the storage tank has a volume which increases during a period of high rate of inflow and which decreases during a subsequent period of lower rate of inflow; and wherein the sewer pipe structure is formed from modular prefabricated sections which include at least:

one storage pipe section which has a cross-sectional area greater than the cross-sectional areas of the inflow pipe and the outflow pipe and which forms at least part of the storage tank;

an inflow end cap fastenable to a first end of the sewer pipe structure to thereby close the first end of the pipe structure, the inflow end cap having connecting means for connecting the inflow end cap to the inflow pipe and for allowing inflow of sewage or sewage/water through the inflow end to the pipe section; and an outflow end cap fastenable to a second end of the sewer pipe structure to thereby close the second end of the pipe structure, the outflow end cap having connecting means for connecting the outflow end cap to the outflow pipe and for allowing outflow of sewage or sewage/water mixture from the pipe section through the outflow end cap to the outflow pipe.

2. A sewer pipe structure as claimed in claim 1, wherein the sewage pipe structure is formed of a plurality of storage pipe sections joined together in series.

3. A sewer pipe structure as claimed in claim 1 wherein each storage pipe section has a dry weather flow channel extending therethrough in an axial direction along the base thereof.

4. A sewer pipe structure as claimed in claim 3, wherein the dry weather flow channel is formed by a pair of arcuate sections of pipe which extend longitudinally along the base of each storage pipe section in spaced-apart relation to one another.

5. A sewer pipe structure as claimed in claim 4, wherein the pair of arcuate sections of pipe define a generally V-shaped channel in cross-section narrowing towards the base of the channel, the convex surfaces of the two arcuate sections of pipe facing each other.

6. A sewer pipe structure as claimed in claim 1, wherein at least one storage pipe section includes an overflow weir which allows water flowing over the weir to flow to at least one spill outflow through which the overflow water is discharged from the sewer pipe structure.

7. A sewer pipe structure as claimed in claim 6, wherein the overflow weir is at least one side weir extending longitudinally of the storage pipe, and wherein means are provided for conveying the water which flows over the weir to the or each spill outflow.

8. A sewer pipe structure as claimed in claim 6 wherein the or each side weir is formed by the lip of a channel formed from an arcuate section of pipe attached to the internal wall surface of the storage pipe section, for conveying the water which flows over the weir to pipework communicating with the or each spill outflow.

9. A sewer pipe structure as claimed in claim 6, wherein the or each weir is provided with an associated scum board which extends downwardly from the upper internal surface of the relevant storage pipe section, which extends substantially parallel to the weir, which extends to a level below the level of the weir and which is positioned sufficiently close to the weir to resist floatables passing over the weir.

10. A sewer pipe structure as claimed in claim 9, wherein the or each scum board is formed of a pipe section.

11. A sewer pipe structure as claimed in claim 1, wherein an overflow weir is provided extending transversely to the length of the storage pipe for allowing an overflow of water to flow to a spill outflow through which the overflow water is discharged from the pipe structure.

12. A sewer pipe structure as claimed in claim 11, wherein the end weir is formed by a pipe section.

13. A sewer structure as claimed in claim 1 wherein each pipe section and arcuate section of pipe is formed of GRP.

14. A sewer structure as claimed in claim 1, wherein each end cap comprises an infill of concrete a precast concrete panel or a GRP panel.

15. A sewer pipe structure as claimed in claim 1, wherein each storage pipe section has a dry weather flow channel in the base portion thereof, the channel being generally V-shaped in cross-section narrowing towards the base of the channel.

16. A sewer pipe structure as claimed in claim 15, wherein the dry weather flow channel is formed by two arcuate sections of pipe extending longitudinally along the base of each storage pipe section in spaced apart relation to one another, the convex surfaces of the two pipe sections facing each other.

17. A sewer pipe structure as claimed in claim 1, comprising a plurality of storage pipe sections joined together in series, at least a first of the pipe sections containing two side weirs extending longitudinally of the pipe section, each side weir being formed by an overflow channel formed from an arcuate section of pipe, and a second pipe section immediately downstream of the first pipe section including pipes for transferring water which overflows into the overflow channels of the first pipe section to at least one spill outflow through which the overflow water is discharged from the sewer pipe structure.

18. A sewer pipe structure as claimed in claim 1, wherein the storage pipe is formed of a plurality of pipe sections joined together in series, and at or adjacent the downstream end of the sewer pipe structure there is provided an end weir extending transversely of the length of the storage pipe and a spill outflow through which water overflowing the weir is discharged from the pipe structure.

19. A sewer pipe structure as claimed in claim 17, wherein the pipe sections are formed of GRP pipe.

20. A method of constructing a modular, prefabricated sewer pipe structure comprising forming a plurality of pipe sections to be connected together in series to form a storage tank; forming an upstream end cap with connection means to allow the upstream end cap to be connected to an inflow pipe; forming an outflow end cap with connection means to allow the outflow end cap to be connected to an outflow pipe; transporting the formed pipe sections and end caps to an installation site; joining the pipe sections and end caps together at the installation site to form the sewer pipe structure; connecting the formed sewer pipe structure to an existing inflow sewer pipe using the connection means of the inflow end cap; and connecting the formed sewer pipe structure to an existing outflow sewer pipe using the connector means of the outflowend cap.

21. A method as claimed in claim 20, including attaching two arcuate sections of pipe in each of the pipe sections to form a dry weather flow channel extending through the pipe section in an axial direction along the base thereof.

22. A method as claimed in claim 21, wherein the two arcuate sections of pipe define a generally V-shaped cross-section channel which narrows towards the base of the pipe section, the convex surfaces of the two arcuate sections of pipe facing each other.

23. A method according to claim 22, providing an end overflow weir at or adjacent the downstream end of the sewer pipe structure, the overflow weir extending transversely of the length of the sewer pipe structure and allowing an overflow of water to flow to a spill outflow through which the overflow water is discharged from the sewer pipe structure.

24. A method according to claim 20, including attaching in pipe section a side overflow weir extending longitudinally of the pipe section.

25. A method according to claim 24, wherein the method includes attaching an arcuate section of pipe to the internal wail surface of the pipe section to form a channel extending longitudinally of the pipe section, an edge of the channel defining the side overflow weir.

26. A method according to claim 24, including providing a scum board associated with the or each weir.

27. A method according to claim 20, wherein each pipe and each arcuate section of pipe is formed of GRP.

28. A method according to claim 20, including forming a closed end wall in each end cap with an infill of concrete, a precast concrete panel or a GRP panel.

29. A pipe section for use as a stilling pond in a sewer pipe structure, the pipe section comprising a pair of arcuate sections of pipe attached in parallel spaced apart relationship to the internal surface of the pipe section in a lower part of the pipe section, the pair of arcuate sections of pipe forming benching for the pipe section and defining therebetween a generally V-shaped channel narrowing towards the lowermost part of the pipe section, the convex surfaces of the two arcuate sections of pipe facing each other.

30. A pipe section for use as a weir section in a sewer pipe structure, the pipe section comprising a side weir extending longitudinally of the pipe section, the side weir being formed by a free edge of a channel which is attached to the interior surface of the pipe section to extend longitudinally along the pipe section in an upper part of the pipe section, the base of the channel being spaced above the base of the pipe section.

31. A pipe section as claimed in claim 30 which comprises additionally a scum board which is attached to an upper part of the interior surface of the pipe section, which extends downwardly from the upper part of the interior surface of the pipe section, which extends longitudinally along the pipe section spaced apart from the side weir and which has a lower edge at a level below the level of the side weir.

32. A pipe section for use as a transfer unit in a sewer pipe structure, the pipe section having a first cross-section and the pipe section carrying a smaller cross-section pipe attached to an upper part of an interior surface of the pipe section, the smaller cross-section pipe carrying therethrough a flow of overflow water separated from a main flow of sewage or sewage/water mixture.

33. A pipe section as claimed in claim 30 further comprising a scum board which is attached to an upper part of the interior surface of the pipe section and extends downwardly from the upper surface to define a lower edge which lies below the edge of the weir.

34. A pipe section as claimed in claim 33 wherein the scum board is formed from an arcuate section of pipe.

35. A sewer pipe structure comprising a plurality of pipe sections joined together, said plurality of pipe sections including:
a first pipe section for use as a stilling pond in the sewer pipe structure, the first pipe section comprising a pair of arcuate sections of pipe attached in parallel spaced apart relationship to the internal surface of the pair of arcuate sections of pipe forming benching for the first pipe section and defining therebetween a generally V-shaped channel narrowing towards the base of the first pipe section; and
a second pipe section for use as a weir section in the sewer pipe structure, the second pipe section comprising a side weir extending longitudinally of the second pipe section, the side weir being formed by a free edge of a channel which is attached to the interior surface of the second pipe section to extend longitudinally along the second pipe section in an upper part of the second pipe section, the base of the channel being spaced above the base of the second pipe section.

36. A sewer pipe structure comprising a plurality of pipe sections joined together, said plurality of pipe sections including:
a first pipe section for use as a stilling pond in the sewer pipe structure, the first pipe section comprising a pair of arcuate sections of pipe attached in parallel spaced apart relationship to the internal surface of the pair of arcuate sections of pipe forming benching for the first pipe section and defining therebetween a generally V-shaped channel narrowing towards the base of the first pipe section; and
a second pipe section for use as a transfer unit in the sewer pipe structure, the second pipe section comprising a first cross-section and the second pipe section carrying a smaller cross-section pipe attached to an upper part of the interior surface of the second pipe section, the smaller cross-section pipe carrying therethrough a flow of overflow water separated from a main flow of sewage or sewage/water mixture.

37. A sewer pipe structure comprising a plurality of pipe sections joined together, said plurality of pipe sections including:
a first pipe section for use as a stilling pond in the sewer pipe structure, the first pipe section comprising a pair of arcuate sections of pipe attached in parallel spaced apart relationship to the internal surface of the pair of arcuate sections of pipe forming benching for the first pipe section and defining therebetween a generally V-shaped channel narrowing towards the base of the first pipe section; and
a second pipe section for use as a weir section in the sewer pipe structure, the second pipe section comprising a weir extending transversely across the second pipe section, the weir formed from an arcuate section of pipe.

38. A sewer pipe structure comprising a plurality of pipe sections joined together, said plurality of pipe sections including:
a first pipe section for use as a weir section in the sewer pipe structure, the first pipe section comprising a side weir extending longitudinally of the first pipe section, the side weir being formed by a free edge of a channel which is attached to the interior surface of the first pipe section to extend longitudinally along the first pipe section in an upper part of the first pipe section, the base of the channel being spaced above the base of the first pipe section; and
a second pipe section for use as a transfer unit in the sewer pipe structure, the second pipe section comprising a first cross-section and the second pipe section carrying a smaller cross-section pipe attached to an upper part of the interior surface of the second pipe section, the smaller cross-section pipe carrying therethrough a flow of overflow water separated from a main flow of sewage or sewage/water mixture.

39. A sewer pipe structure comprising a plurality of pipe sections joined together, said plurality of pipe sections including:
a first pipe section for use as a weir section in the sewer pipe structure, the first pipe section comprising a side weir extending longitudinally of the first pipe section, the side weir being formed by a free edge of a channel which is attached to the interior surface of the first pipe section to extend longitudinally along the first pipe section in an upper part of the first pipe section, the base of the channel being spaced above the base of the first pipe section; and
a second pipe section for use as a weir section in the sewer pipe structure, the second pipe section comprising a weir extending transversely across the second pipe section, the weir formed from an arcuate section of pipe.

40. A sewer pipe structure comprising a plurality of pipe sections joined together, said plurality of pipe sections including:

a first pipe section for use as a transfer unit in the sewer pipe structure, the first pipe section comprising a first cross-section and the first pipe section carrying a smaller cross-section pipe attached to an upper part of the interior surface of the first pipe section, the smaller cross-section pipe carrying therethrough a flow of overflow water separated from a main flow of sewage or sewage/water mixture; and a second pipe section for use as a weir section in the sewer pipe structure, the second pipe section comprising a weir extending transversely across the second pipe section, the weir formed from an arcuate section of pipe.

41. A pipe section as claimed in claim 30, including two said side weirs in spaced apart relation and extending longitudinally on opposite sides of the pipe section, and wherein overflow water flowing over each side weir is discharged through a spill overflow pipe.

42. A sewer pipe structure comprising a storage tank connectable at an upstream end to an inflow pipe to receive therefrom an inflow of sewage or sewage/water mixture and connectable at a downstream end to an outflow pipe through which the sewage or sewage/water mixture can flow from the storage tank, wherein:

the sewage or sewage/water mixture accumulated in the storage tank has a volume which increases during a period of high rate of inflow and which decreases during a subsequent period of lower rate of inflow; and wherein:

the sewer pipe structure comprising at least:

one storage pipe section which has a cross-sectional area greater than the cross-sectional areas of the inflow pipe and the outflow pipe and which forms at least part of the storage tank;

a closed inflow end of the pipe structure, having connecting means for connecting the inflow end to the inflow pipe and for allowing inflow of sewage or sewage/water mixture through the inflow end to the pipe section;

a closed outflow end of the pipe structure, having connecting means for connecting the outflow end to the outflow pipe and for allowing outflow of sewage or sewage/water mixture from the pipe section through the outflow end to the outflow pipe;

within the storage section at least one side weir extending longitudinally of the pipe section, the or each side weir being formed by a free edge of a channel which is attached to an interior surface of the pipe section to extend longitudinally along the pipe section in an upper part of the pipe section, a base of the channel being spaced above a base of the pipe section; and a spill outflow pipe connected to the pipe section, through which spill outflow pipe overflow water flowing over the or each side weir is discharged from the sewer pipe structure.

43. A sewer pipe structure as claimed in claim 42, wherein the storage pipe section has two spaced apart side weirs extending longitudinally on opposite sides of the pipe section, and wherein overflow water flowing over each side weir is discharged through the same spill outflow pipe.

44. A sewer pipe structure as claimed in claim 42, wherein the storage pipe section and the or each side weir are provided as a prefabricated unit.

45. A sewer pipe structure as claimed in claim 42, wherein the structure is formed from prefabricated sections.

\* \* \* \* \*